US012537150B2

(12) United States Patent
Sahni et al.

(10) Patent No.: US 12,537,150 B2
(45) Date of Patent: Jan. 27, 2026

(54) SWITCHING UNIT FOR A VEHICLE

(71) Applicant: UNO Minda Limited, Haryana (IN)

(72) Inventors: Rahul Sahni, Haryana (IN); Ravinder Mehla, Haryana (IN); Nitin Singh, Haryana (IN); Sanjay Kumar, Haryana (IN)

(73) Assignee: UNO Minda Limited, Gurgaon (IN)

( * ) Notice: Subject to any disclaimer, the term of this patent is extended or adjusted under 35 U.S.C. 154(b) by 201 days.

(21) Appl. No.: 18/467,105

(22) Filed: Sep. 14, 2023

(65) Prior Publication Data

US 2024/0096569 A1 Mar. 21, 2024

(30) Foreign Application Priority Data

Sep. 15, 2022 (IN) ............................. 202211052846

(51) Int. Cl.

*H01H 19/06* (2006.01)
*B60K 35/10* (2024.01)
*H01H 19/02* (2006.01)
*H01H 19/14* (2006.01)

(52) U.S. Cl.

CPC ............ *H01H 19/14* (2013.01); *B60K 35/10* (2024.01); *H01H 19/025* (2013.01); *H01H 19/06* (2013.01); *B60K 2360/126* (2024.01); *B60K 2360/332* (2024.01); *B60K 2360/42* (2024.01); *H01H 2207/034* (2013.01); *H01H 2231/026* (2013.01)

(58) Field of Classification Search

CPC ...... H01H 19/14; H01H 19/025; H01H 19/06; H01H 19/065; H01H 2223/003; H01H 3/08; H01H 9/04

USPC ............................................. 200/302.1, 564

See application file for complete search history.

(56) References Cited

U.S. PATENT DOCUMENTS 4,486,918 A * 12/1984 Peebles .................... G05G 1/10
16/DIG. 30
5,506,378 A * 4/1996 Goldenberg ............. H01H 3/08
200/336
12,266,485 B2 * 4/2025 Fujii ...................... H01H 19/04
2014/0262711 A1 * 9/2014 Clark ....................... H01H 9/22
200/302.1

FOREIGN PATENT DOCUMENTS

GB 2266186 A * 10/1993 ........... H01H 13/702

* cited by examiner

*Primary Examiner* — Renee S Luebke

(74) *Attorney, Agent, or Firm* — Rothwell, Figg, Ernst & Manbeck, P.C.

(57) ABSTRACT

A switching unit (200) including a membrane (202), a housing (210), at least one rotary switch (204), at least one knob (216), and a sealing member (214). The membrane (202) defines a first opening (230) adapted to receive a portion of at least one rotary switch (204). The housing (210) defines a second opening adapted to be aligned with the first opening (230) to receive the portion of the at least one rotary switch (204). The at least one rotary switch (204) is disposed in the housing (210). The at least one knob (216) mounted on the at least one rotary switch (204). The sealing member (214) is positioned on the housing (210) in the second opening (231), around the at least one rotary switch (204), between the at least one knob (216) and the housing (210).

9 Claims, 6 Drawing Sheets

SWITCHING UNIT FOR A VEHICLE

CROSS-REFERENCE TO RELATED APPLICATION

This application claims priority to and the benefit of Indian Patent Application No. 202211052846, filed on Sep. 15, 2022, the disclosure of which is incorporated herein by reference in its entirety.

FIELD OF THE DISCLOSURE

The present disclosure relates to the field of automobiles. In particular, the present disclosure relates to a switching unit with a rotary switch for a vehicle.

BACKGROUND

Vehicles such as, but not limited to, four-wheelers and two-wheelers are equipped with at least one switching apparatus. The at least one switching apparatus may be provided for controlling various operations of the vehicle such as adjusting the side mirrors, controlling the windows, locking, and unlocking the doors, and several other purposes. Such switches may include a rotary knob, one or more switches, a Printed Circuit Board (PCB), and at least one light source. The rotary knob may be adapted to be rotated by a user to adjust the side mirrors. One or more switches are adapted to be actuated by the user to control one of the windows and the doors.

Currently, the switching apparatus may include a rubber membrane for sealing the components of the switching apparatus. The sealing is provided from an upper side of the switching apparatus, so it does not seal the rotary knob and one or more connectors. Thus, the foreign particles such as water, dust, and moisture may enter the existing switching apparatus. This may affect the functionality of the switching apparatus and lower the performance of the switching apparatus.

Accordingly, a switching apparatus that overcomes one or more of the above-mentioned technical problems of the existing switches, is desirable.

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

The present disclosure relates to a switching unit for a vehicle. The switching unit may include a membrane, a housing, at least one rotary switch, at least one knob, and a sealing member. The membrane defines a first opening adapted to receive a portion of at least one rotary switch. The housing defines a second opening adapted to be aligned with the first opening to receive the portion of the at least one rotary switch. The at least one rotary switch is at least partially disposed in the housing. The at least one knob is mounted on the at least one rotary switch, and the at least one knob is adapted to be rotated to actuate the at least one rotary switch. The sealing member is positioned on the housing in the second opening, around the at least one rotary switch, between the at least one knob and the housing. The sealing member is adapted to seal a contact portion formed between the at least one knob and the at least one rotary switch.

The sealing member is positioned in the second opening of the housing, in between the housing and the at least one knob. The sealing member may include a third opening to support the at least one rotary switch. The sealing member is positioned at a contact portion formed between the knob and the at least one rotary switch. Thus, the implementation of the sealing member may prevent the entry of water, dust, and moisture at the contact portion. Further, the mounting member is moulded within the housing to accommodate the connector. The mounting member may provide the sealing to a portion in a vicinity of the connector for preventing the entry of the foreign particles.

To further clarify the advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1C:
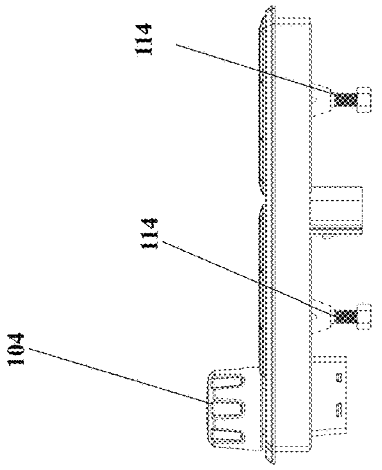
Fig. 1c (Prior Art)
FIG. 1*c* illustrates a side view of the existing switching apparatus.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by existing symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF FIGURES

While the embodiments in the disclosure are subject to various modifications and alternative forms, the specific embodiment thereof has been shown by way of example in the figures and will be described below. It should be understood, however, that it is not intended to limit the disclosure to the particular forms disclosed, but on the contrary, the disclosure is to cover all modifications, equivalents, and alternatives falling within the scope of the disclosure.

It is to be noted that a person skilled in the art would be motivated from the present disclosure to modify a switching unit for a vehicle as disclosed herein. However, such modifications should be construed to be within the scope of the disclosure. Accordingly, the drawings show only those specific details that are pertinent to understand the embodiments of the present disclosure, so as not to obscure the disclosure with details that will be readily apparent to those of ordinary skill in the art having benefit of the description herein.

Accordingly, the switching unit for the vehicle is described with reference to the figures and specific embodiments; this description is not meant to be constructed in a limiting sense.

Embodiments of the present disclosure will be described below in detail with reference to the accompanying drawings.

Figure 1B:
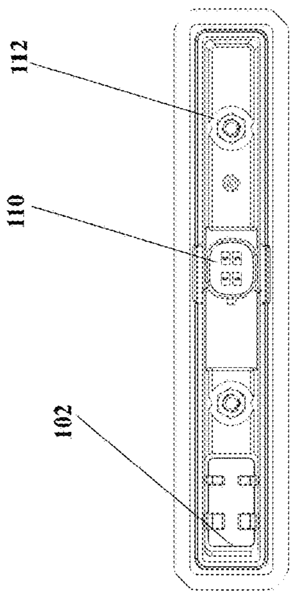
Fig. 1b (Prior Art)
FIG. 1*b* illustrates a bottom view of the existing switching apparatus.
Figure 1A:
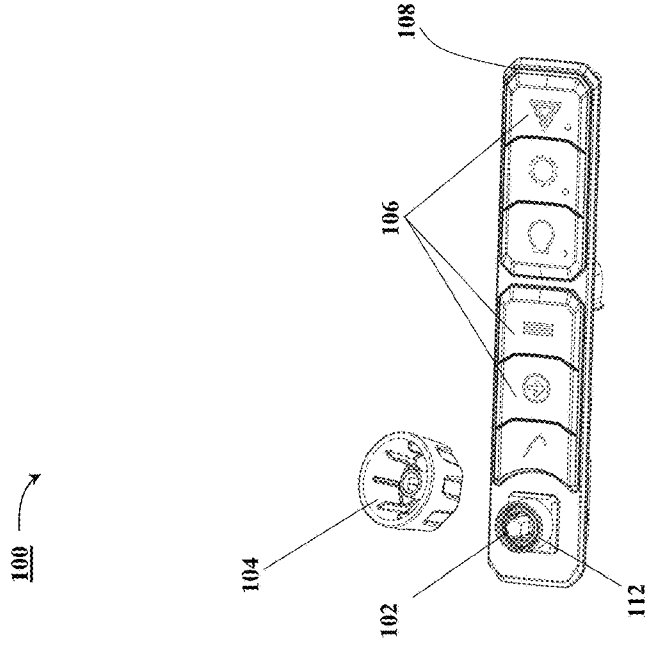
Fig. 1a (Prior Art)
FIG. 1*a* illustrates a top view of an existing switching apparatus.

FIG. 1*a* illustrates a top view of an existing switching apparatus 100 while FIG. 1*b* illustrates a bottom view of the existing switching apparatus 100. Further, FIG. 1*c* illustrates a side view of the existing switching apparatus 100. Referring to FIG. 1*a*, FIG. 1*b*, and FIG. 1*c*, the existing switching apparatus 100 is disclosed that includes a housing (not shown), a rotary switch 102, a rotary knob 104, a plurality of illuminated switches 106, a rubber membrane 108, and a Printed Circuit Board (PCB). The rotary knob 104 is mounted on the rotary switch 102 to actuate the rotary switch 102. The PCB is disposed in the housing. The rotary knob 104 and the plurality of illuminated switches 106 are installed on one side of the PCB, and a connector 110 is installed on another side of the PCB. The rubber membrane 108 is positioned to accommodate the rotary knob 104 and the plurality of illuminated switches 106. The rubber membrane 108 is adapted to provide a sealing to the rotary knob 104, and the plurality of illuminated switches 106. A contact portion is formed between the rotary switch 102 and the rubber membrane 108. The contact portion and a bottom side of the existing switching apparatus 100 are sealed by using an Epoxy layer 112. The existing switching apparatus 100 includes a plurality of mounting fasteners 114 adapted to mount the existing switching apparatus 100 in a vehicle.

However, the existing switching apparatus 100 does not provide any sealing to a bottom portion of the at least one knob 104. Thus, the foreign particles including water, dust, and moisture are entered in a portion formed between the rotary knob 104 and the rotary switch 102. Further, the connector 110 disposed on the PCB is not sealed properly, so the foreign particles enter and come in contact with the connector 110. This affects the functionality of the existing switching apparatus 100 and, the existing switching apparatus 100 may stop working or malfunction. Moreover, the entry of foreign particles affects the working of the plurality of illuminated switches 106.

Figure 2:
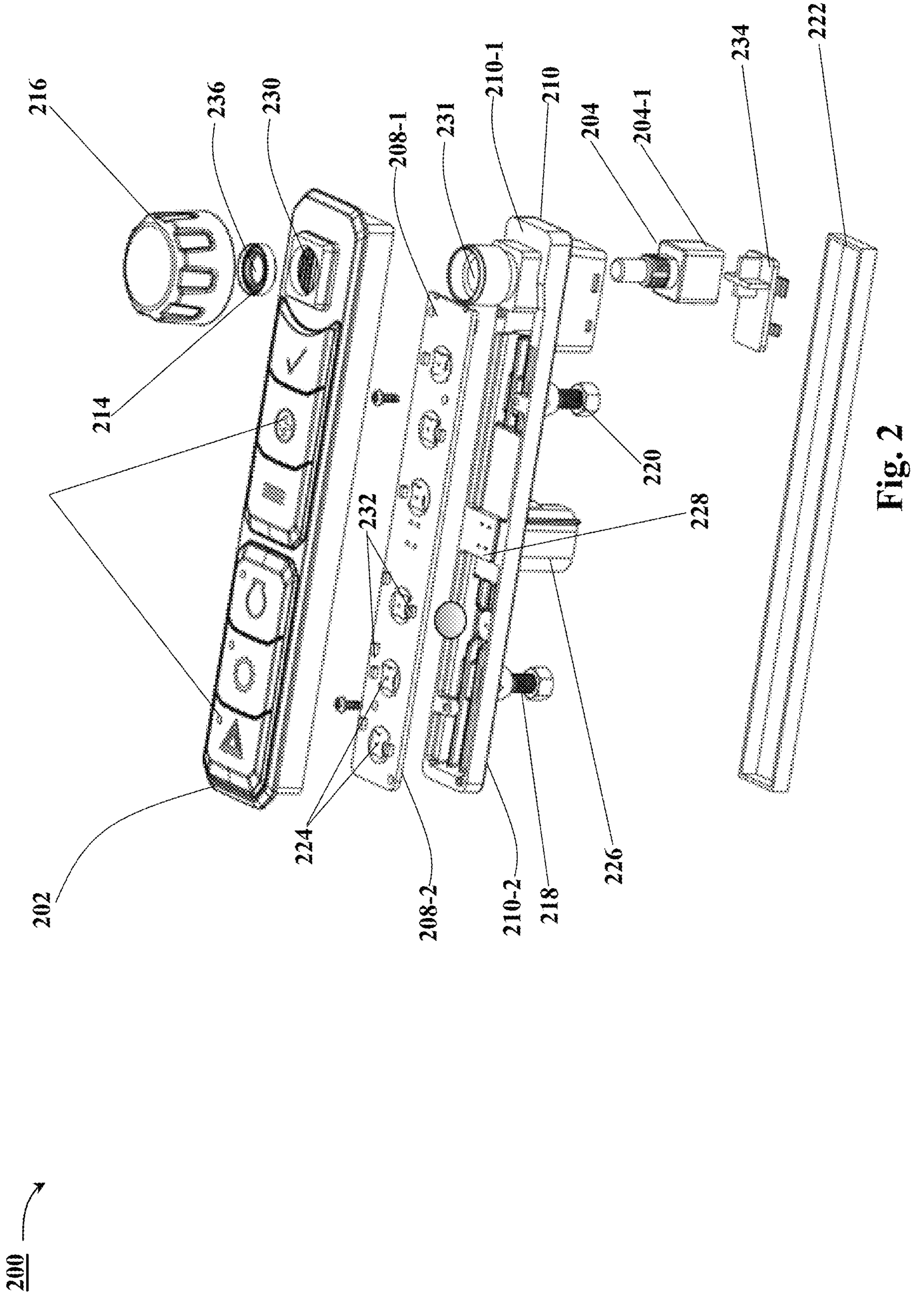
FIG. 2 illustrates an exploded view of a switching unit, according to an embodiment of the present disclosure.
Figure 3:
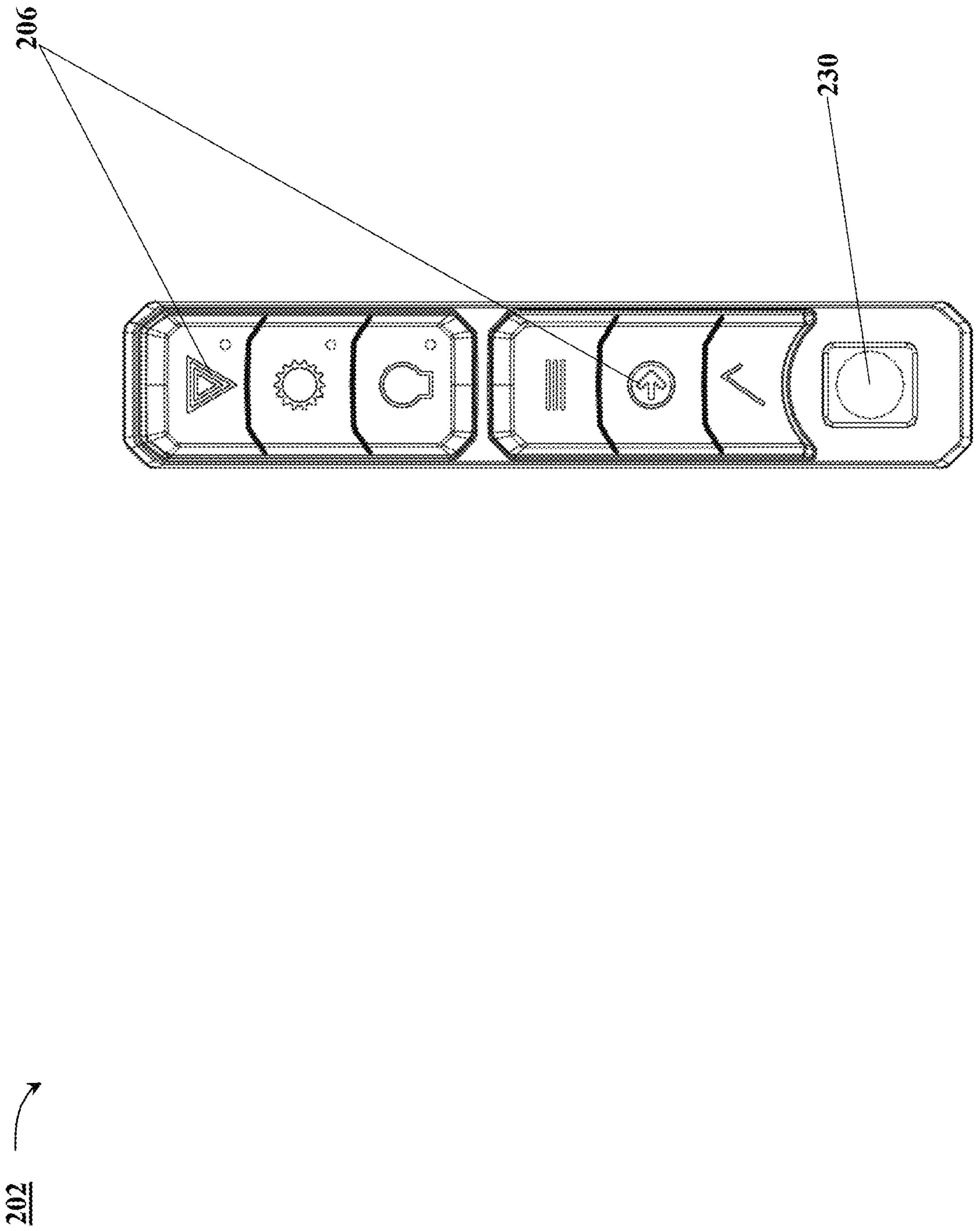
FIG. 3 illustrates a top view of a membrane of the switching unit, according to an embodiment of the present disclosure.
Figure 4:
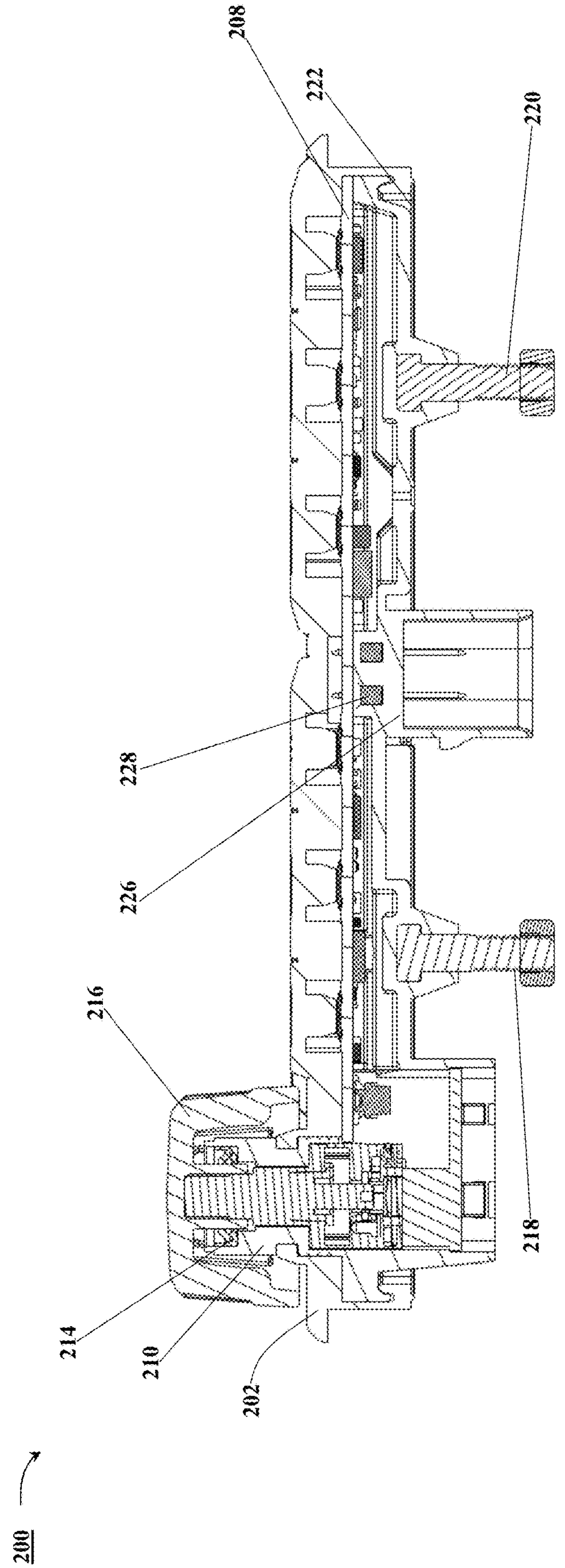
FIG. 4 illustrates a side-sectional view of the switching unit, according to an embodiment of the present disclosure.
Figures 5A, 5B, 5C:
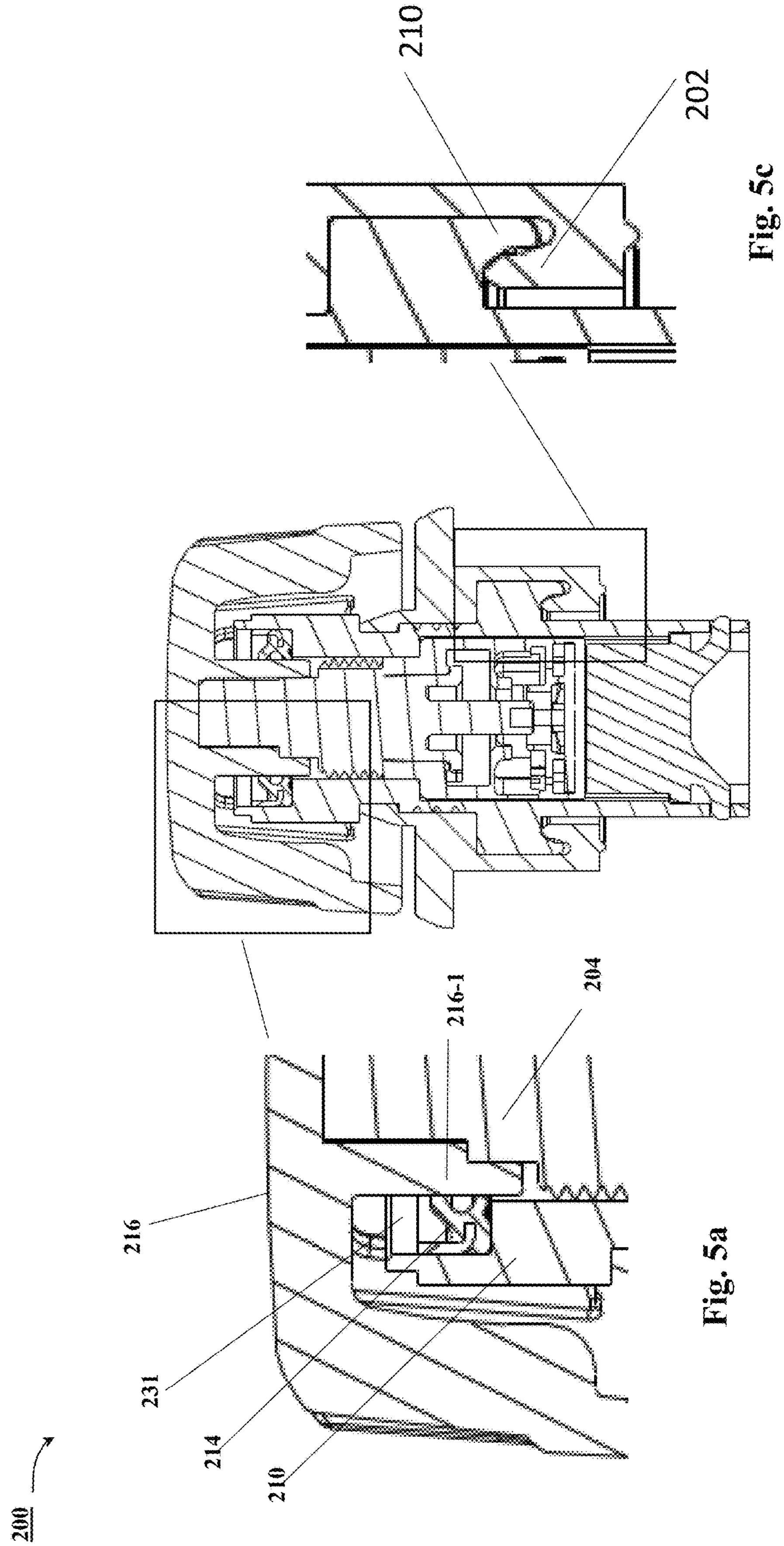
FIGS. 5*a*, 5*b*, 5*c* illustrates side-sectional views of the switching unit, according to an embodiment of the present disclosure.

Details of a switching unit 200 of the present disclosure are explained with reference to FIGS. 2 to 5*a*-5*c*. Specifically, FIG. 2 illustrates an exploded view of the switching unit 200 while FIG. 3 illustrates a top view of a membrane 202 of the switching unit 200, according to an embodiment of the present disclosure. Further, FIG. 4 illustrates a side sectional view of the switching unit 200 while-FIG. 5 FIGS. 5*a*, 5*b*, and 5*c* illustrate side-sectional views of the switching unit 200 according to an embodiment of the present disclosure.

Referring to FIGS. 2, 3, 4, 5*a*, 5*b*, and 5*c*, the switching unit 200 is adapted to be equipped in a vehicle. Herein, the switching unit 200 may be interchangeably referred to as the sealed multi-colour illuminated membrane switching unit 200, without departing from the scope of the present disclosure. The switching unit 200 may be provided for controlling various operations of the vehicle such as, but not limited to, adjusting the side mirrors, controlling the windows, locking and unlocking of the doors, and several other purposes.

The switching unit 200 may include the membrane 202, at least one rotary switch 204, a plurality of switches 206, a Printed Circuit Board (PCB) 208, a housing 210, a sealing member 214. The membrane 202 may accommodate the at least one rotary switch 204 and the plurality of switches 206. Further, the switching unit 200 may include at least one knob 216 coupled with the at least one rotary switch 204. The at least one knob 216 is adapted to be rotated to actuate the at least one rotary switch 204.

The housing 210 is adapted to support one or more components of the switching unit 200. The housing 210 defines a second opening 231 adapted to receive the portion of the at least one rotary switch 204. The housing 210 may include an upper face 210-1 and a lower face 210-2 opposite to the upper face 210-1. The upper face 210-1 is adapted to support one of the PCB 208 and the membrane 202. The housing 210 may include a mounting member 226 positioned on the lower face 210-2 of the housing 210, and a pair of connecting terminals 228 positioned on the upper face 210-1. The pair of connecting terminals 228 may be aligned with the mounting member 226. The pair of connecting terminals 228 is adapted to form an electrical connection with the PCB 208.

The mounting member 226 is adapted to receive at least one connector to be electrically connected with the pair of connecting terminals 228. The at least one connector may also be connected to a power source of the vehicle to supply power to the switching unit 200. The mounting member 226 is adapted to be mounted in a frame of the vehicle, such that the switching unit 200 may be secured in the vehicle. The mounting member 226 may provide a sealing to a portion in the vicinity of the connector for preventing the ingress of the foreign particles such as water, dust, and moisture.

The lower face 210-2 of the housing 210 may be sealed by using one of an adhesive layer and a resin layer to prevent the ingress of the foreign particles. In an example, the lower face 210-2 of the housing 210 may be sealed by using an Epoxy layer 222. In one embodiment, the mounting member 226 may be integrated with the housing 210. Herein, the housing 210 and the mounting member 226 may be integrally formed by using a moulding process. In another embodiment, the mounting member 226 may be fastened to the housing 210.

Further, the housing 210 may include a plurality of fasteners 218, 220 positioned on the lower face 210-2 of the housing 210, adjacent to the mounting member 226. The plurality of fasteners 218, 220 is adapted to mount the switching unit 200 in the vehicle. The plurality of fasteners 218, 220 may be fastened to a frame of the vehicle to secure the housing 210 with the vehicle. In an embodiment, the plurality of fasteners 218, 220 may include a first fastener 218 and a second fastener 220.

The first fastener 218 and the second fastener 220 are adapted to mount the switching unit 200 in the vehicle, and the mounting member 226 may be positioned in between the first fastener 218 and the second fastener 220. The plurality of fasteners 218, 220 may be embodied as a plurality of bolts or a plurality of screws, without departing from the scope of the present disclosure. In an embodiment, the housing 210 may be formed of a polymeric material. In another embodiment, the housing 210 may be formed of a metallic material.

The PCB 208 may be positioned in between the membrane 202 and the housing 210 and is adapted to support the at least one rotary switch 204. The PCB 208 may be disposed on the upper face 210-1 of the housing 210. The PCB 208 may include an upper surface 208-1 and a lower surface 208-2 opposite to the upper surface 208-1. The upper surface 208-1 is adapted to support the membrane 202 and, the membrane 202 is snap fitted in the housing 210 to enclose the PCB 208. The lower surface 208-2 is adapted to be positioned on the upper face 210-1 of the housing 210.

The PCB 208 may include a plurality of tactile contacts 224 installed on the upper surface 208-1 of the PCB 208. The plurality of tactile contacts 224 is adapted to be actuated by the plurality of switches 206. Upon actuation, the plurality of switches 206 may form a contact with the plurality of tactile contacts 224. The plurality of tactile contacts 224 may be further connected with the connector through the connecting terminals 228 to provide an input indicative of the actuation of the plurality of switches 206. The PCB 208 may be coupled with the connecting terminals 228 placed in the mounting member 226. The connector may be connected with a controller to provide the input indicative of the actuation of one of the plurality of switches 206 and the at least one rotary switch 204. Further, the PCB 208 may include a plurality of light-emitting diode (LEDs) 232 installed, adjacent to the plurality of tactile contacts 224, on the upper surface 208-1 and adapted to illuminate to indicate a current state of the plurality of switches 206. Herein, the current state may be one of the OFF-state or ON-state.

The at least one rotary switch 204 may be disposed on the housing 210, and the portion of the at least one rotary switch 204 may be supported in the membrane 202. The at least one rotary switch 204 may include an encoder 204-1 adapted to be positioned in the second opening 231 of the housing. Further, a cover member 234 is adapted to cover a bottom portion of the encoder 204-1. The at least one rotary switch 204 may be positioned adjacent to the plurality of switches 206. The at least one rotary switch 204 is adapted to be actuated by the rotation of the at least one knob 216. The at least one knob 216 may be rotatably mounted on the portion, of the at least one rotary switch 204, protruding above the membrane 202.

The at least one knob 216 is adapted to be rotated in one of a clockwise direction and an anti-clockwise direction to operate the at least one rotary switch 204. In the illustrated embodiment, the at least one rotary switch 204 may include a rotary switch 204 mounted on the PCB 208. In another embodiment, the at least one rotary switch 204 may include more than one rotary switch 204 mounted on the PCB 208.

The membrane 202 may be positioned on the housing 210. The membrane 202 may be removably inserted into the housing 210. In an embodiment, the membrane 202 may be snap fitted into the housing 210. The membrane 202 may be adapted to support the at least one rotary switch 204 and the plurality of switches 206. The membrane 202 may define at least one opening adapted to accommodate the at least one rotary switch 204 and the plurality of switches 206. The membrane 202 may be embodied as a bracket, without departing from the scope of the present disclosure. In one embodiment, the membrane 202 may be formed of the polymeric material. In another embodiment, the membrane 202 may be formed of the metallic material.

The membrane 202 is adapted to provide the sealing to the at least one rotary switch 204 and the plurality of switches 206 to prevent the ingress of the foreign particles. Herein, the plurality of switches 206 is adapted to make contact with the plurality of tactile contacts 224 of PCB 208. Herein, the plurality of switches 206 may illuminate to indicate the current state of the plurality of switches 206.

The plurality of switches 206 may illuminate upon the supply of the power from the power source. The plurality of switches 206 may illuminate in different colors to represent an operation of each of the plurality of switches 206. The plurality of switches 206 may be referred to as multi-color illuminated switches. Thus, the membrane 202 may also be referred to as a sealed multi-color illuminated membrane 202.

Referring to FIG. 2, the membrane 202 may include a first opening 230 adapted to receive the portion of the at least one rotary switch 204 mounted on the PCB 208. The second opening 231 of the housing 210 may be aligned with the first opening 230 to receive the portion of the at least one rotary switch 204. Herein, a portion of the at least one rotary switch 204 is enclosed by the membrane 202, and another portion of the at least one rotary switch 204 may be protruded through the first opening 230 of the membrane 202 as shown in FIGS. 2 and 3. The protruded portion of the at least one rotary switch 204 may accommodate the at least one knob 216. The at least one knob 216 is mounted on the protruded portion of the at least one rotary switch 204 to operate the at least one rotary switch 204.

Figure 6B:
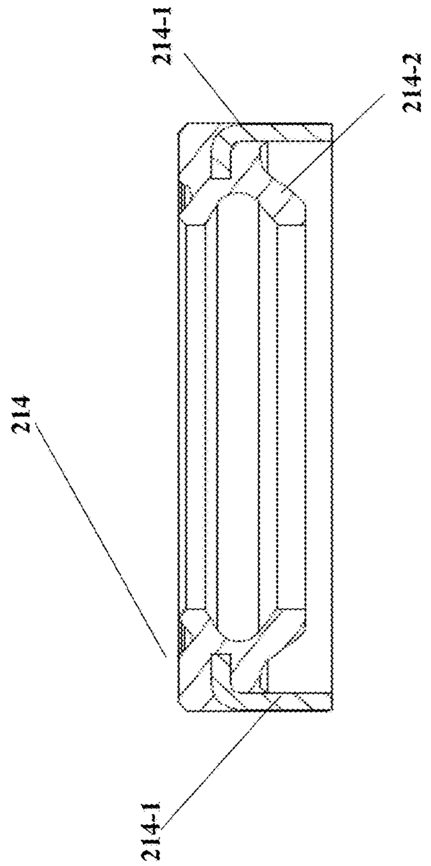
FIG. 6*b* illustrates a side-sectional view of the sealing member of the switching unit, according to an embodiment of the present disclosure.
Figure 6A:
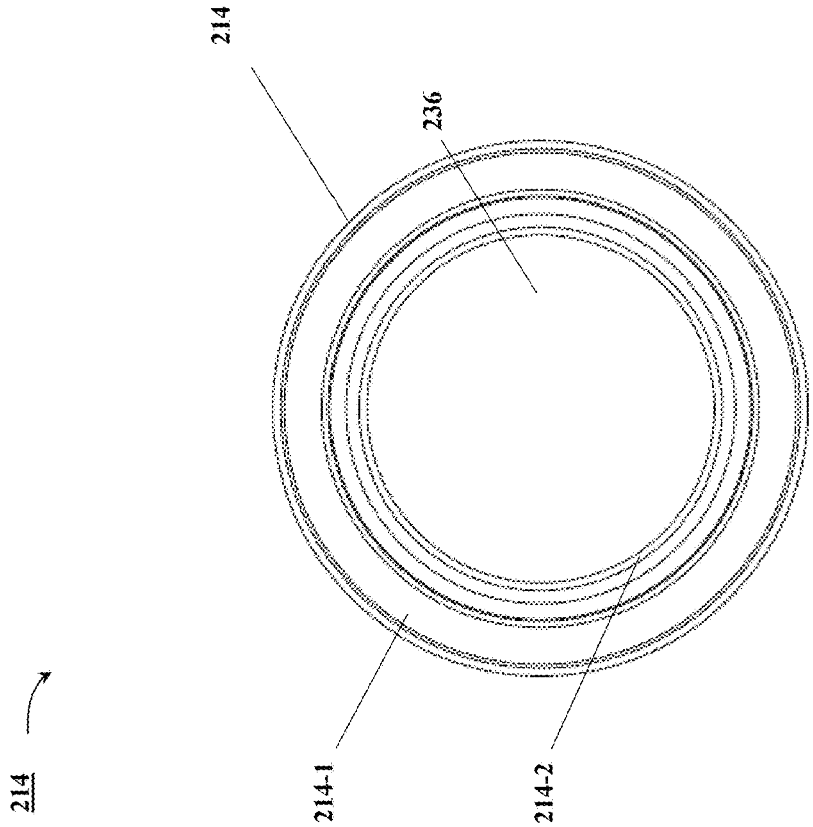
FIG. 6*a* illustrates a top view of a sealing member of the switching unit, according to an embodiment of the present disclosure.

FIG. 6*a* illustrates a top view of the sealing member 214 of the switching unit 200 while FIG. 6*b* illustrates a side-sectional view of the sealing member 214 of the switching unit 200. Referring to FIGS. 2, 4, 5*a*, 5*b*, 5*c*, 6*a*, and 6*b*, the sealing member 214 may be positioned on the housing 210, around the at least one rotary switch 204.

The sealing member 214 may accommodate the at least one knob 216. The at least one knob 216 may be positioned over the sealing member 214 to enclose the sealing member 214. The sealing member 214 may cover a contact portion formed between the at least one knob 216 and the housing 210. A movement takes place in the contact portion while the at least one knob 216 is rotated to operate the at least one rotary switch 204. The sealing member 214 may be positioned in between the at least one knob 216 and the housing 210. In an embodiment, the sealing member 214 may be positioned in the second opening 231 of the housing 210, between the housing 210 and the at least one knob 216.

The sealing member 214 may include a rim and a base defining a third opening 236. The third opening 236 is adapted to be aligned with the first opening 230 and the second opening 231 to receive the portion of the at least one rotary switch 204. The third opening 236 may be embodied as hole 236, without departing from the scope of the present disclosure. The rim is formed around the base and is adapted to support the elastic part 214-2 disposed on the base.

The sealing member 214 may include a metallic part 214-1 and an elastic part 214-2. The metallic part 214-1 defines an outer periphery adapted to be positioned adjacent to the second opening 231 of the housing 210. The elastic part 214-2 defines an outer periphery and an inner periphery adapted to be positioned adjacent to the at least one knob 216. In an embodiment, the outer periphery of the elastic part 214-2 is positioned within the periphery of the metallic part 214-1, and the inner periphery of the elastic part 214-2 is positioned along an outer periphery of an inner protruded portion 216-1 of the at least one knob 216.

Further, the elastic part 214-2 may be positioned within the periphery of the metallic part 214-1. The elastic part 214-2 may be embodied as a rubber seal, without departing from the scope of the present disclosure. In an embodiment, the metallic part 214-1 and the elastic part 214-2 may be molded as an integral structure. In another, the metallic part 214-1 and the elastic part 214-2 may be joined together by using adhesives such as glue.

The sealing member 214 may be positioned in between the housing 210 and the at least one knob 216. The sealing member 214 is adapted to seal the contact portion formed between the at least one knob 216 and the at least one rotary switch 204. Thus, the sealing member 214 may prevent the entry of water, dust, and moisture into the contact portion. Thus, the movement of the at least one knob 216 and the at least one rotary switch 204 is not interrupted by the entry of water, dust, and moisture at the contact portion.

The switching unit 200 of the present disclosure provides the sealing to the contact portion of the at least one knob 216 and the at least one rotary switch 204, as the contact portion formed between the at least one knob 216 and the second opening 231 of the housing 210 may be covered with the sealing member 214. The sealing member 214 may prevent the entry of foreign particles such as water, dust, and moisture inside the switching unit 200. This improves the functionality and performance of the switching unit 200. Further, the switching unit 200 of the present disclosure provides the sealing to the portion around the connector. This prevents the entry of water, dust, and moisture into the switching unit 200, and improves the performance of the switching unit 200.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A switching unit for a vehicle, the switching unit comprising:

a membrane defining a first opening adapted to receive a portion of at least one rotary switch;

a housing defining a second opening adapted to be aligned with the first opening to receive the portion of the at least one rotary switch;

the at least one rotary switch at least partially disposed in the housing;

at least one knob mounted on the at least one rotary switch, the at least one knob adapted to be rotated to actuate the at least one rotary switch;

a sealing member positioned on the housing in the second opening, around the at least one rotary switch, between the at least one knob and the housing, wherein the sealing member is adapted to seal a contact portion formed between the at least one knob and the at least one rotary switch, and wherein the sealing member comprises:

a metallic part defining a periphery adapted to be aligned with the second opening of the housing; and an elastic part positioned within the periphery of the metallic part, wherein an outer periphery of the elastic part is positioned within the periphery of the metallic part, and an inner periphery of the elastic part is positioned along an outer periphery of an inner protruded portion of the at least one knob.

2. The switching unit as claimed in claim 1, wherein the sealing member comprises:

a base defining a third opening adapted to be aligned with the first opening and the second opening to receive the portion of the at least one rotary switch; and a rim formed around the base and adapted to support the elastic part, wherein the elastic part is disposed on the base.

3. The switching unit as claimed in claim 1, wherein the membrane comprises a plurality of switches adjacent to the at least one rotary switch.

4. The switching unit as claimed in claim 1, comprising a Printed Circuit Board (PCB) positioned in between the membrane and the housing, and the PCB is adapted to support the at least one rotary switch.

5. The switching unit as claimed in claim 4, wherein the PCB comprises:

an upper surface adapted to support the membrane; and a lower surface opposite to the upper surface and adapted to be positioned on the housing.

6. The switching unit as claimed in claim 5, wherein the PCB comprises:

a plurality of tactile contacts installed on the upper surface of the PCB and adapted to be actuated by the plurality of switches; and a plurality of light-emitting diode (LEDs) installed, adjacent to the plurality of tactile contacts, on the upper surface and adapted to illuminate to indicate a current state of the plurality of switches.

7. The switching unit as claimed in claim 4, wherein the housing comprises a pair of connecting terminals adapted to form an electrical connection with the PCB.

8. The switching unit as claimed in claim 7, wherein the housing comprises a mounting member adapted to receive at least one connector adapted to be electrically connected with the pair of connecting terminals.

9. The switching unit as claimed in claim 1, wherein the at least one rotary switch comprises an encoder adapted to be positioned in the second opening of the housing and a bottom portion of the encoder is covered by a cover member.

* * * * *